June 18, 1935.   J. M. HIGH   2,005,421
LIGHT DISPLAY APPARATUS
Filed Sept. 30, 1932   2 Sheets-Sheet 1

INVENTOR
John M. High
BY
ATTORNEY

June 18, 1935.  J. M. HIGH  2,005,421
LIGHT DISPLAY APPARATUS
Filed Sept. 30, 1932   2 Sheets-Sheet 2
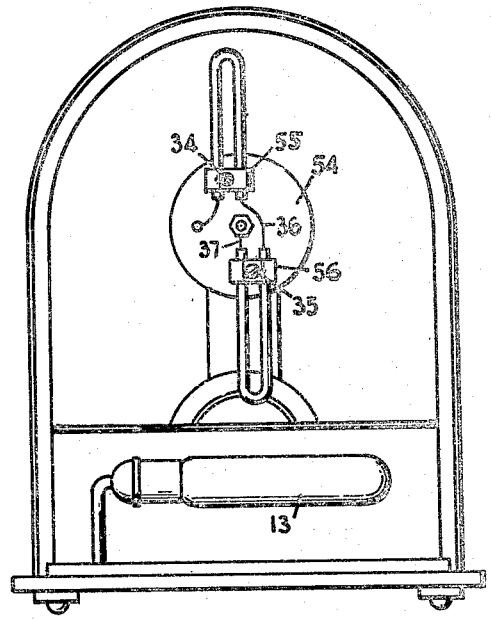
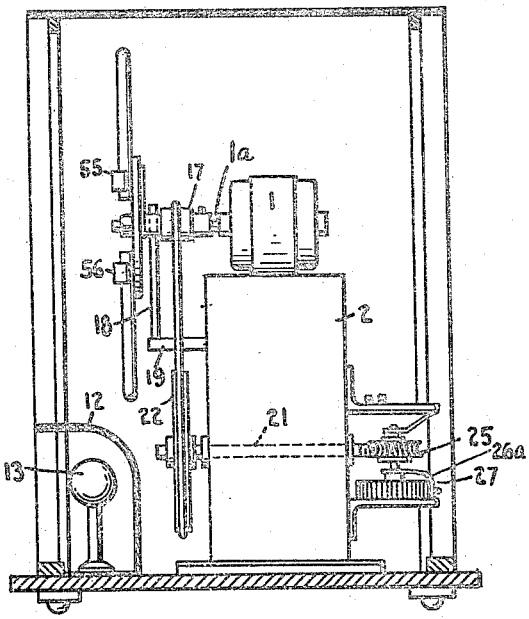
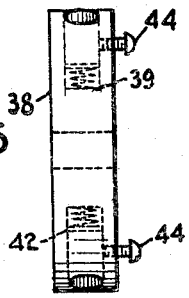
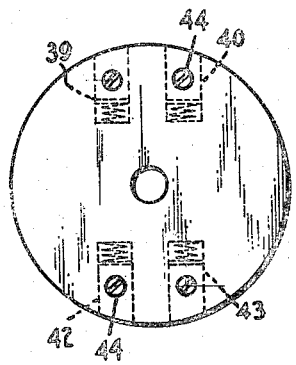
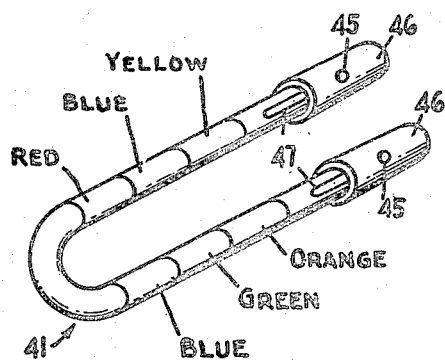
INVENTOR
John M. High
BY
ATTORNEY Patented June 18, 1935

2,005,421

UNITED STATES PATENT OFFICE 2,005,421

LIGHT DISPLAY APPARATUS

John M. High, New York, N. Y.

Application September 30, 1932, Serial No. 635,623

4 Claims. (Cl. 240—10.1)

This invention relates to light display apparatus and more particularly to such apparatus adapted and arranged to produce an attention-arresting light effect, such as is used in advertising signs and the like, and as an educational, instructive or entertaining demonstration of various types of stroboscopic effects and changing color patterns.

It is an object of this invention to provide apparatus of the class described which shall be relatively low in manufacturing and operating cost, and rugged and reliable in operation.

It is a further object of this invention to provide apparatus of the class described which is capable of adjustment and control in operation to produce any one or more of a large number of optical effects.

It is still a further object of my invention to provide apparatus of the class described which may be adjusted or controlled to produce periodic variations or different light effects in a predetermined sequence and in a repeating cycle.

Still other objects and advantages of my invention will be apparent from the specification.

The features of novelty which I believe to be characteristic of my invention are set forth with particularity in the appended claims. My invention itself, however, both as to its fundamental principles, and as to its particular embodiments, will be best understood by reference to the specification and accompanying drawings, in which Fig. 1 is a side elevation view partly in section of one form of apparatus according to my invention;

Figs. 3 and 4 are respectively front and side elevation views, partly in section, of a slightly different form of apparatus embodying my invention;

Figs. 5 and 6 are respectively side and front elevation views of one form of disk which may be employed to mount the luminous tubes utilized, and Fig. 7 is a perspective view of one form of tube which may be employed.

When alternating, interrupted, or fluctuating current is applied to a lamp having substantially zero optical inertia, such as a gaseous discharge lamp, the lamp will be illuminated during only such time as the applied voltage is equal to or greater than the ignition voltage of the lamp. Ordinarily, in the case of alternating current, the lamp will be illuminated during each half cycle for the length of time during which the E. M. F. applied is sufficient to break down the gaseous path between the electrodes.

If the lamp is stationary, as will be understood, the eye will be unable to detect the dark interval unless the frequency is very low, and the lamp will appear to be continuously lighted, but if the lamp be swung in a circular path at a sufficiently high rate of speed, it will not trace out a complete circular zone or area of light, but there will be dark and light sectors observable.

The number of the dark sectors, as well as of the light or illuminated sectors, their angular width, and position, are functions of the frequency or interruption frequency of the voltage applied, the illumination characteristics of the tubes employed, the number, shape and position of the tubes employed, and the speed of rotation of the tubes.

In accordance with my invention I utilize a plurality of such lamps mounted for rotation at a speed having a predetermined and controllable relation to the frequency and/or interruption frequency of the current utilized for illumination of the lamps, and control or vary one or more of the factors above discussed to produce variations in the effects observed.

The apparatus in accordance with my invention produces striking and attractive optical effects. For example, with the apparatus herein shown and described I am able to obtain a considerable number of optical patterns which merge one into another periodically and repeatedly; for instance, by varying merely the speed of rotation of the lamps alone and maintaining the other factors constant, I am able to produce an effect resembling a wheel of light which may be stationary, then appears to rotate slowly, then increases its speed of rotation, and then changes its apparent direction and the number of its spokes and the number, character and disposition of its colors. Many other curious and striking optical displays can be produced by varying the controlling factors, such as by utilizing lamps of different colors and/or of different shapes and by varying the number and position of the lamps utilized, and changing the frequency or interruption frequency of the current employed, and by blocking out, or blackening, various portions of the lamp or lamps employed.

Figure 1:
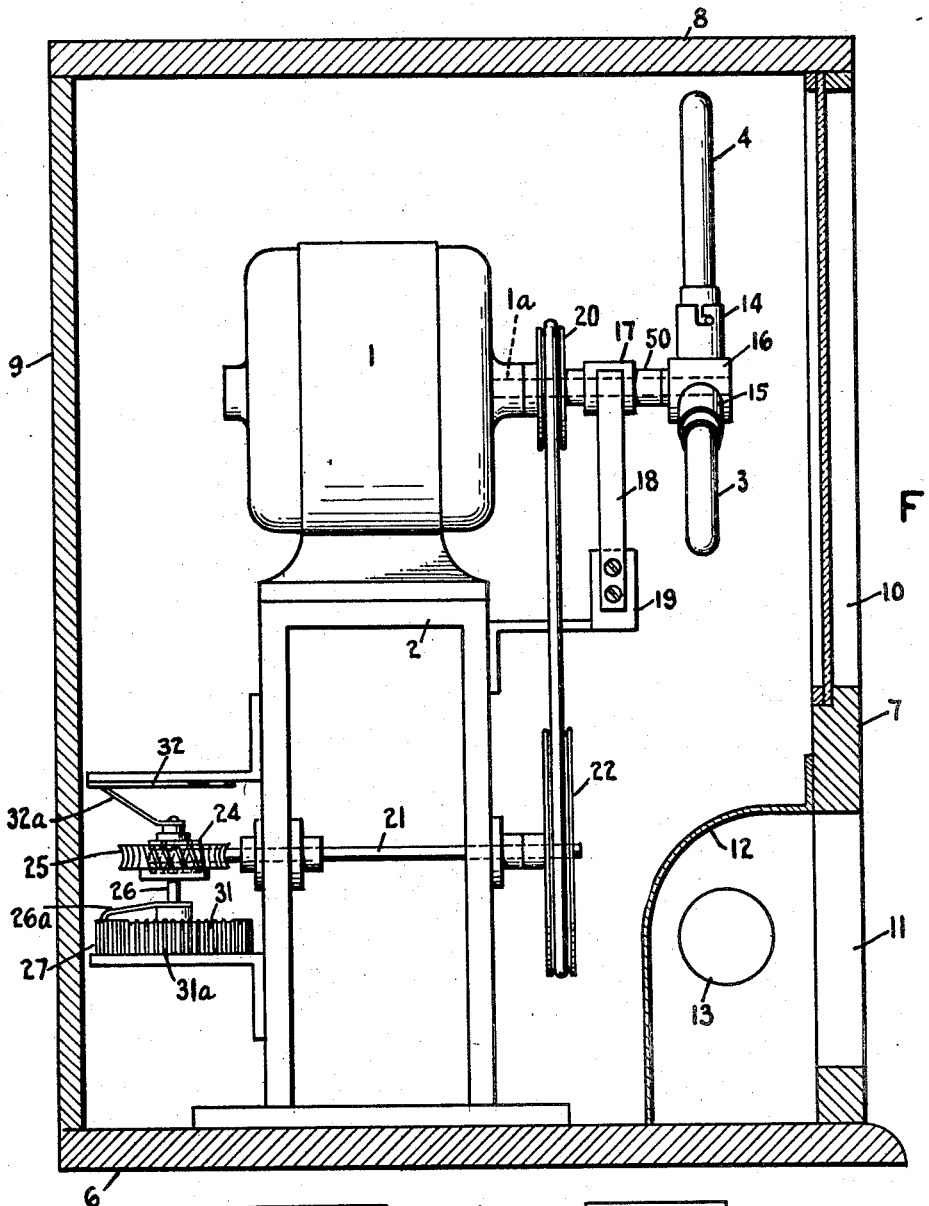

Referring now more particularly to Fig. 1 of the drawings, 1 designates a motor, or other source of power for rotating the lamps, mounted upon a suitable support 2 and carrying on its shaft 1a a number of lamps such as 3 and 4. In the embodiment shown in Fig. 1 I utilize three lamps extending radially from the shaft and disposed 120 degrees apart, thus forming a symmetrical and balanced arrangement, but it will be understood that a greater or less number of lamps may be utilized if desired.

I prefer to utilize gaseous discharge lamps having a pair of electrodes within an evacuated transparent envelope, and it will be understood that the lamps may all emit the same color light when stationary or that various of the lamps may emit different colors, or that different portions of the same lamp may emit different colored light. The color of the light to be produced may be controlled by choosing different gases in the various lamps, as will be understood by those skilled in the art, and/or the lamp envelopes may be coated with transparent or translucent coloring material or may be formed of colored material.

While I have shown lamps extending radially outward it will be apparent that this is not essential, and that the lamps may be placed at an angle to the radius and that lamps of various shapes and configurations may be utilized, as may be determined by the particular effects desired.

For the purpose of providing an automatic and cyclical variation in the speed of rotation of the lamps the driven shaft may be provided with a pulley 20 and a second shaft 21 may be provided in the motor support if desired and carrying a pulley 22 adapted to be driven from pulley 20 through the medium of a belt affording a primary speed reduction if desired. Shaft 21 may be provided with a second speed reduction arrangement, such as worm 24 engaging a gear 25, and both the ratios of the pulleys 20 and 22 and the worm 24 and gear 25 may be chosen to obtain the desired rate of speed of gear 25. The gear 25 is attached to the shaft 26 carrying contact arm 26a of a rheostat 27 in the motor circuit which operates in a manner well understood in the art to vary the motor speed, and while I have shown the rheostat connected in series with the motor, it will be understood that various other arrangements known in the art may be utilized for the purpose, such, for example, as the use of a tapped field winding, more or less of which is included in the motor circuit by contact 26.

It will be understood that as the motor rotates the contact arm 26a is also rotated and introduces more or less resistance in the motor circuit, the effect of which is to cause the motor to change its speed in a predetermined, repeating cycle from maximum to minimum. The motor speed and the rate of change of speed are functions of the value of resistance introduced in the motor circuit and the rate of speed of the rheostat arm 26a which in turn is controlled by the motor. By a selection of the maximum, minimum, and intermediate values of the rheostat in relation to the motor speed the motor speed may be made to be such as to include particularly desirable optical patterns, to exclude undesirable patterns and to control the length of time the various patterns are displayed.

If the apparatus is to be used as an advertising device, I may provide a casing or housing comprising a bottom 6, front panel 7, top 8, and back 9, the front panel 7 having an opening 10 preferably covered with transparent or translucent material such as plain or frosted glass through which the light play may be observed, and in addition another opening 11 may be provided, behind which I may mount another lamp 13 so that advertising devices or matter may be displayed on a panel, more or less transparent or translucent, covering the opening 11.

A shield 12 is preferably provided above and behind the lamp 13 to prevent the light from the lamp 13 interfering with the light effects from the rotating lamps. If desired, the rotating lamps and the lamp 13 may be alternatively energized for predetermined periods, as for example, by means of commutator 32 having conducting segments 29 and 30 separated by an insulating segment 33 over which the brush 32a which may be mounted on shaft 26 passes, or the lamp 13 may be intermittently illuminated by other suitable apparatus. Alternatively, or in addition, any desired legend may be formed of gaseous discharge tubing and mounted in back of the opening 10, and this lamp tubing may be intermittently or continuously energized. The rotating lights may be continuously or periodically energized, or the lamp tubing and the rotating tubes may be alternately energized.

As will be understood, the relative period of illumination of either lamps may be controlled by selection of the length of conducting sections 29 and 30 with reference to the length of travel of contact 32a.

Various types of gaseous discharge tubes may be utilized and various methods of making the connections to the electrodes may be provided. In general, however, I prefer to utilize arrangements in which the gaseous discharge lamps are mechanically supported in a hub and the necessary electrical connections to the lamps are made through sockets in the hub. This considerably simplifies the apparatus, and one method by which this may be done is shown in Fig. 1, the lamp in this case being of the gaseous discharge type known and obtainable on the market under the name of "Tun-A-Lite" and provided with a standard form of bayonet base such as used in automobile lamps. Each of the lamps is provided with two contacts on its base or with a single contact on its base and one on its side, the two contacts being connected within the lamp respectively to a pair of electrodes of such construction that when the lamp is energized it appears as a column of light.

In the arrangement shown the shaft 1a carries a hub 16 of insulating material on which there are mounted in any suitable manner the desired number of sockets 14 and 15, in this case three in number. These are of the type adapted to receive the tubes desired to be utilized and preferably a similar terminal of each socket is connected together and grounded upon the motor shaft. The opposite terminals of each of the sockets are likewise connected together and to a conducting sleeve 50 insulated from the shaft 1a. A slip ring 17 is mounted insulatingly upon the shaft 1a and is electrically connected with the sleeve 50 and thus to the similar socket terminals and a brush 18 insulatingly supported upon a bracket 19 may be connected to the motor support as indicated.

Thus one terminal of the line may be connected to the grounded terminal of the motor and the other side of the line may be connected in parallel to the brush 18 and to the ungrounded motor terminal. In such an arrangement it is necessary that the tubes and the motor should have similar voltage characteristics so that they may be operated in parallel.

Figure 2:
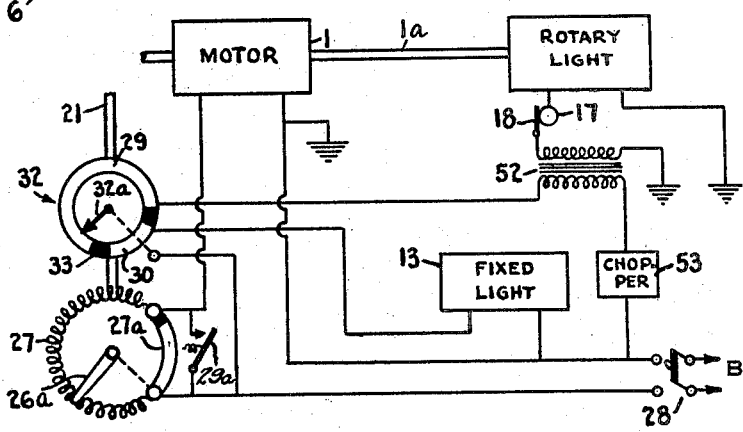
Fig. 2 is a wiring diagram thereof.

If this is not the case and the tubes require a greater voltage than the motor, it may be necessary to interpose a transformer 52 between the line and the gaseous lamp circuit as indicated in Fig. 2, the turn ratio and other characteristics of the transformer being so chosen as to supply to the tubes the desired current and voltage.

Since the design and construction of such transformer forms per se no part of the present invention and is well understood in the art, it is not described in detail.

Under certain conditions, to increase or vary the effects obtainable, it may be desirable to interpose in the rotary lamp circuit a "chopper" or tone-wheel 53. Such apparatus is well understood in the radio art and it is not believed necessary to describe the same in detail. It consists merely of a commutator or interrupter usually mounted on a rotary shaft, the number of segments and speed of which are so chosen that the circuit may be interrupted at an audible frequency which may be varied within wide limits. Very satisfactory results have been obtained with the tone-wheel or chopper arranged to interrupt the rotary lamp circuit at a frequency of 500 cycles per second.

For the purpose of controlling the apparatus a line switch 28 may be provided and for convenience of starting, in case a relatively high value of resistance is included in the motor circuit at the particular position of the motor rheostat, a switch 29a may be provided to by-pass the rheostat 27. The switch 29 may be spring biased to open position as indicated, and in order to start the apparatus, the line switch 28 may be closed and the switch 29a depressed for a few moments, thus short-circuiting the rheostat 27 and permitting the motor to come quickly to maximum speed, after which the switch 29a is permitted to open, thus including rheostat 27 in the motor circuit.

The rheostat 27 usually consists of a strip of fiber bent into the form of a circular segment having a slight gap therein. In order to provide for continuous rotation of the contact arm 26a the stops which are customarily provided to prevent rotation of the contact arm beyond the ends of the segment may be removed and a bridge 27a provided to bridge the opposite ends. The bridge 27a may be of insulating material, but if made of conducting material care should be taken to provide a slight gap at one end to prevent a short-circuit of the rheostat. Thus in operation the contact arm 26a continuously rotates and the value of resistance included in the motor circuit is dependent upon the position of the contact arm 26a.

It will be understood that a wide range of control of motor speed is obtained by varying the manner of winding of the rheostat 27. In its usual form this rheostat consists of a fiber strip 31 on which there is wound a resistance wire 31a and as the contact arm 26a rotates a greater or lesser number of turns of the wire 31a are included in the motor circuit. It will be understood that by spacing the turns close together at one part of the insulating strip, the rate of change of the motor speed is increased, whereas by spreading the turns apart it is decreased. Also if it is desired, for instance, to hold the motor speed constant during a certain period of time, a section of low resistance wire may be interposed in the resistance wire 31a or, if desired, a suitable number of adjacent turns of the wire 31a may be short-circuited.

Under certain conditions, particularly where the line voltage fluctuates, it may be possible to omit the connection between the rheostat and the motor, speed variations being obtained by the variation of the line voltage. Also it may be desirable to substitute an interrupter or "flasher" for the rheostat in the motor circuit.

In order to provide for still additional effects, the chopper 53 may be driven at a constant speed or it may be driven at a speed which varies in proportion to the speed of the motor, or it may be varied in a different manner by the introduction of a second motor for driving the chopper 53, the speed of which second motor may be independently controlled by apparatus similar to that already described for controlling the speed of the motor 1. Thus it will be observed that I have provided apparatus in which a number of variable factors are provided, all of which may be controlled as desired in a predetermined manner to selectively determine the effects to be produced.

By variation of one or more of these factors as above indicated, a practically infinite number of combinations of effects may be produced.

Referring now more particularly to Figs. 3 and 4, I have shown a slightly different mounting arrangement for the tubes and also the use of a slightly different type of tube. In this instance instead of providing sockets on the shaft 1a I provide a disk 54 utilizing tubes bent in the form of a U. The tubes may be clamped to the disk 54 by means of metal straps 55 and 56 held in position by bolts 34 and 35 passing through the disk 54 and engaging nuts on the back thereof. In this arrangement the tubes may be operated in series instead of in parallel as in the arrangement shown in Fig. 1, one electrode of each of the tubes being connected together as by a common lead 36 and one of the two remaining terminals being grounded to the motor shaft as at 37, and the other terminal being connected to slip ring 17 as before.

Referring now more particularly to Figs. 5 and 6, I have shown still a further arrangement which for some purposes is preferable to that of Figs. 3 and 4, in that the disk 38 is provided with peripheral depressions 39 and 40 to receive the ends of a U tube 41 and with similar depressions 42 and 43 to receive the ends of a second U tube. The disk 38 is preferably of insulating material such as molded porcelain, "bakelite", or the like, and each of the depressions 39, 40, 42 and 43 is preferably provided with a spring mounted therein adapted to engage and make contact with the base of the tube inserted therein. Connection may be made to the spring as already described with reference to the embodiment of Figs. 1, 3 and 4.

To secure the tube in position set screws 44 may be provided in each depression or socket arrangement to engage depressions 45 formed on base 46 of the tube. The base 46 may be a sleeve or thimble of conducting material such as brass, copper or other suitable metal secured on the end of the tube by any suitable basing cement and connected to the electrodes 47 in each end, and the figure indicates how various portions of the tube may be given different colors to produce striking effects.

While I have shown and described certain preferred embodiments of my invention, it will be understood that my invention is not limited thereto but that modifications and changes may be made within the spirit of my invention and within the scope of the appended claims, as will be understood by those skilled in the art.

In case alternating current is not available it may be necessary to utilize some form of interrupter, particularly where the tubes to be used require a higher voltage than is obtainable from the line. However, in cases where the tubes will operate with line voltage some stroboscopic effects may be obtained without the use of an interrupter due probably to periodic fluctuations in the line voltage, such as high frequency ripple. In general, however, when only direct current is available better results will be obtained by the provision of some form of commutator or chopper, even though the tubes will operate on the line voltage.

I claim:

1. In an optical display device, in combination, a rotary shaft, a lamp mounted thereon for rotation, a motor for driving said shaft, and means driven by said motor for causing the rate of speed of rotation to vary in a predetermined manner, said means comprising a wire wound rheostat having its resistance non-uniformly disposed throughout its length, a wiper for engaging said rheostat, and a driving connection between said motor and said wiper.

2. In an optical display device, in combination, a rotary shaft, a lamp mounted thereon for rotation, a motor for driving said shaft, and means driven by said motor for causing the rate of speed of rotation of said lamp to vary in a repeating cycle, said means comprising a wire wound rheostat and a wiper arm driven by said motor engaging said rheostat, said rheostat being so arranged that during a part of the travel of said wiper arm the resistance is constant.

3. In an optical display device, in combination, a rotary shaft, a lamp mounted thereon for rotation, a motor for driving said shaft, and means driven by said motor for causing the rate of speed of rotation to vary in a repeating cycle, said means comprising a wire wound rheostat having its resistance non-uniformly disposed, and a wiper arm driven by said motor engaging said rheostat, said rheostat having its resistance non-uniformly disposed and being so arranged that during a part of the travel of said wiper the resistance is constant.

4. In an optical display device, in combination, a rotary shaft, a lamp mounted thereon for rotation, a motor for driving said shaft, and means driven by said motor for causing the rate of speed of rotation of said lamp to vary in a repeating cycle, said means comprising a wire wound resistance annular in form having its resistance non-uniformly arranged, and a wiper arm pivoted centrally thereof for engaging said resistance.

JOHN M. HIGH.